(12) United States Patent
Maharyta et al.

(10) Patent No.: US 9,110,552 B2
(45) Date of Patent: Aug. 18, 2015

(54) ELIMINATING COMMON MODE NOISE IN OTUCH APPLICATIONS

(71) Applicant: Cypress Semiconductor Corporation, San Jose, CA (US)

(72) Inventors: Andriy Maharyta, Lviv (UA); Oleksandr Karpin, Lviv (UA); Yuriy Boychuk, Lviv (UA); Milton Ribeiro, Los Altos, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 13/912,028

(22) Filed: Jun. 6, 2013

(65) Prior Publication Data

US 2014/0253492 A1    Sep. 11, 2014

Related U.S. Application Data

(60) Provisional application No. 61/776,086, filed on Mar. 11, 2013.

(51) Int. Cl.
G06F 3/041    (2006.01)
G06F 3/044    (2006.01)

(52) U.S. Cl.
CPC ..................... *G06F 3/044* (2013.01)

(58) Field of Classification Search
USPC ................................. 345/173–178
See application file for complete search history.

(56) References Cited

U.S. PATENT DOCUMENTS 5,543,588 A    8/1996  Bisset et al.
5,543,591 A    8/1996  Gillespie et al.
5,825,352 A    10/1998 Bisset et al.
8,416,209 B2   4/2013  Hotelling et al.
8,441,453 B2   5/2013  Westerman et al.

(Continued)

FOREIGN PATENT DOCUMENTS

EP    0777875 A    6/1997

OTHER PUBLICATIONS

Newelectrnoics; "CES 2012: Touchscreen controllers set new standards of performance",( retrieved from www.newelectronics.co.uk/electronics-news/ces-2012-touchscreen-controllers-set-new-standards-of-performance/39401/ on Apr. 30, 2013), 2 pages.

(Continued)

*Primary Examiner* — Andrew Sasinowski
*Assistant Examiner* — Nguyen H Truong
(74) *Attorney, Agent, or Firm* — Lowenstein Sandler LLP

(57) ABSTRACT

A processing device scans, during a first operation, a first plurality of electrodes along a first axis in a capacitive sense array to generate a first plurality of signals corresponding to a mutual capacitance at electrode intersections of the capacitive sense array. During a second operation, the processing device scans a second plurality of electrodes along a second axis in the capacitive sense array to generate a second plurality of signals corresponding to the mutual capacitance at the electrode intersections of the capacitive sense array, wherein the second operation occurs during a different period of time than the first operation. The processing device determines a first coordinate of a conductive object proximate to the capacitive sense array based on the first plurality of signals and a second coordinate of the conductive object based on the second plurality of signals.

20 Claims, 7 Drawing Sheets

(56) References Cited

U.S. PATENT DOCUMENTS

| | | |
|---|---|---|
| 2007/0229466 A1 | 10/2007 | Peng et al. |
| 2009/0184934 A1 | 7/2009 | Lin et al. |
| 2009/0267916 A1 | 10/2009 | Hotelling |
| 2009/0273579 A1* | 11/2009 | Zachut et al. ............ 345/174 |
| 2010/0044122 A1 | 2/2010 | Sleeman et al. |
| 2010/0073325 A1 | 3/2010 | Yang |
| 2010/0193258 A1 | 8/2010 | Simmons et al. |
| 2011/0115729 A1 | 5/2011 | Kremin et al. |
| 2011/0254802 A1 | 10/2011 | Philipp |
| 2011/0304585 A1* | 12/2011 | Chang et al. ............ 345/174 |
| 2012/0044199 A1 | 2/2012 | Karpin et al. |
| 2012/0050216 A1 | 3/2012 | Kremin et al. |
| 2012/0068964 A1 | 3/2012 | Wright et al. |
| 2012/0086671 A1 | 4/2012 | Brown et al. |
| 2012/0139867 A1 | 6/2012 | Chang et al. |
| 2012/0154322 A1 | 6/2012 | Yang et al. |
| 2012/0206407 A1* | 8/2012 | Taylor et al. ............ 345/174 |
| 2012/0229417 A1 | 9/2012 | Badaye |
| 2012/0268415 A1 | 10/2012 | Konovalov et al. |
| 2013/0076646 A1 | 3/2013 | Krah et al. |
| 2013/0076675 A1 | 3/2013 | Shin et al. |
| 2013/0082719 A1 | 4/2013 | Prendergast et al. |
| 2014/0035832 A1* | 2/2014 | Poulsen ............ 345/173 |

OTHER PUBLICATIONS

Search Report for "Eliminating Common Mode Noise in Touch Applications", May 3, 2013, 14 pages.

U.S. Appl. No. 14/018,360: "Reducing Common Mode Noise in Touch Applications," Oleksiy Savitsky et al., filed Sep. 4, 2013; 40 pages.

USPTO Non-Final Rejection for U.S. Appl. No. 14/023,342 dated Nov. 20, 2013; 10 pages.

International Search Report for International Application No. PCT/US13/58147 dated Mar. 18, 2014; 2 pages.

International Search Report for International Application No. PCT/US14/18760 dated Apr. 21, 2014; 3 pages.

USPTO Final Rejection for U.S. Appl. No. 14/023,342 dated Apr. 24, 2014; 12 pages.

Written Opinion of the International Searching Authority for International Application No. PCT/US13/58147 dated Mar. 18, 2014; 7 pages.

Written Opinion of the International Searching Authority for International Application No. PCT/US14/18760 dated Apr. 21, 2014; 7 pages.

Cypress Semiconductor Corp., Capsense Sigma-Delta Data Sheet, Document Number: 001-45840 Rev. *A, revised Feb. 18, 2009, 48 pages.

USPTO Advisory Action for U.S. Appl. No. 14/023,342 dated Jul. 10, 2014; 3 pages.

USPTO Non Final Rejection for U.S. Appl. No. 14/018,360 dated Oct. 21, 2014; 23 pages.

USPTO Non Final Rejection for U.S. Appl. No. 14/023,342 dated Nov. 21, 2014; 11 pages.

* cited by examiner

ELIMINATING COMMON MODE NOISE IN OTUCH APPLICATIONS

RELATED APPLICATIONS

This application claims the benefit of U.S. Provisional Application No. 61/776,086 filed on Mar. 11, 2013, the contents of which are hereby incorporated by reference herein.

TECHNICAL FIELD

This disclosure relates to the field of touch-sensor devices and, in particular, to eliminating common mode noise in touch applications.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, and the like) have user interface devices, which are also known as human interface devices (HID), that facilitate interaction between the user and the computing device. One type of user interface device that has become more common is a touch-sensor device that operates by way of capacitance sensing. A touch-sensor device usually is in the form of a touch-sensor pad, a touch-sensor slider, or touch-sensor buttons, and includes an array of one or more capacitive sense elements. The capacitance detected by a capacitance sensor changes as a function of the proximity of a conductive object to the touch sensor. The conductive object can be, for example, a stylus or a user's finger.

One type of capacitance sensing device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a conductive object) can be detected. In a touch-sensor device, a change in capacitance of each sense element in the X and Y axes of the touch sense array can be measured by a variety of methods. Regardless of the method, usually an electrical signal representative of the capacitance of the capacitive sense elements is measured and processed by a processing device, which in turn produces electrical or optical signals representative of the position of one or more conductive objects in relation to the touch-sensor pad in the X and Y axes. A touch-sensor strip, slider, or button may operate on the same or another capacitance-sensing principle.

BRIEF DESCRIPTION OF THE DRAWINGS

The present disclosure is illustrated by way of example, and not by way of limitation, in the figures of the accompanying drawings.

DETAILED DESCRIPTION

Figure 1:
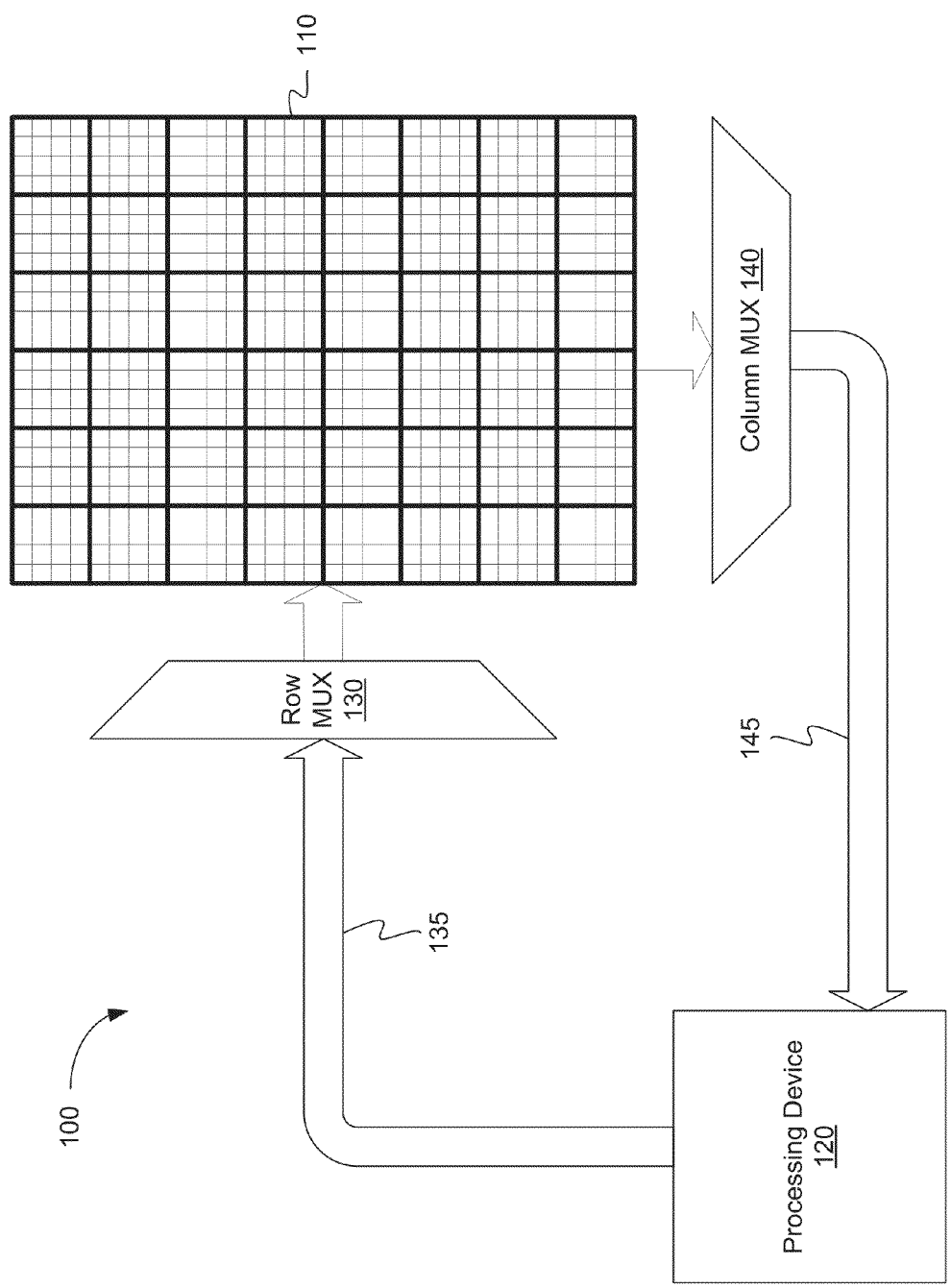
FIG. 1 is a block diagram illustrating a capacitance sensing system, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for eliminating common mode noise in touch applications. A touch-sensor device, such as a touch-screen display, a touch-sensor pad, a touch-sensor slider, or touch-sensor buttons can be used to detect the presence of a conductive object that is on or near the touch-sensor device. The touch-sensor device may include an array of one or more capacitive sense elements (e.g., electrodes). The capacitance detected by a capacitance sensor changes as a function of the proximity of a conductive object to the touch sensor. In one embodiment, the touch-sensor device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a conductive object) can be detected.

In one embodiment, the touch-sensor device is located with an electronic computing device such as a mobile phone, laptop computer, tablet, or other device. As a result, other components in the device may cause noise that can affect the performance of the touch-sensor device. Two examples of this noise are charger noise, such as from a charger used to charge a battery in the electronic device, and display noise, such as from a display located near the touch-sensor device in the electronic device. Charger noise is physically coupled into the sensor during the presence of touch through the battery charger. Charger noise is multiplicative noise in that it affects the electrodes of the touch-sensor device proportionally to the capacitance measured at each electrode. Thus, the charger noise may be higher on electrodes that are closer to the location of a finger touch and less on electrodes that are further away. Display noise is directly coupled across the entire surface of the sensor by the display (e.g., a liquid crystal display (LCD)). Display noise is additive noise in that it affects all electrodes of the touch-sensor device equally. In some embodiments, the charger noise and display noise may be referred to as common-mode noise. In other embodiments, there may be other sources of noise that affect the touch-sensor device.

As the power used by the charger and display vary over time, so too does the noise that these components produce. Thus, if the electrodes of touch-sensor device are scanned successively over a period of time, the noise may change for each scan thereby affecting the capacitance measurements. This may lead to inaccuracies in the position determination of the touch object. To counteract the effects of common mode noise, in one embodiment, a processing device includes at least as may receive channels as there are electrodes along each axis of the touch-sensor device. Thus, in a first time slot, the processing device may scan the electrodes along a first axis of the device (e.g., the vertical columns) and the resulting signals may be used to determine a first coordinate of the touch location (e.g., the X axis coordinate). In a second time slot, the processing device may scan the electrodes along a second axis of the device (e.g., the horizontal row) and the resulting signals may be used to determine a second coordinate of the touch location (e.g., the Y axis coordinate). The second time slot may be a different period of time than the first time slot, however, since all of the columns were scanned at once and all of the rows were scanned at once, the common-mode noise will be consistent within each time slot.

To calculate the coordinates for the position of the touch object, the processing device may select a touch position equation, from a plurality of touch position equations. The equations may include, for example, a centroid equation which is not sensitive to multiplicative charger noise, a linear interpolation equation which is not sensitive to multiplicative charger noise or additive display noise, or other equations. Since the common-mode noise is consistent for the measurement signals on each electrode along a single axis of the touch-sensor device, these equations can effectively remove any measurement error attributable to the noise and output an accurate positional coordinate. This can allow for the accurate determination of a touch location even in the presence of common-mode noise.

FIG. 1 is a block diagram illustrating a capacitance sensing system 100, according to an embodiment of the present invention. In one embodiment, system 100 includes capacitive sense array 110, processing device 120, and multiplexers 130, 140. Capacitive sense array 110 may be part of, for example, a touch-sensing device, such as a touch-sensor pad, a touch-screen display, a touch-sensor slider, a touch-sensor button, or other device. Capacitive sense array 110 may include a matrix of sense elements arranged in rows and columns (e.g., in the X and Y axes) that can be used to detect the proximity or physical contact of a conductive object (e.g., a user's finger). In one embodiment, processing device 120 uses a mutual capacitance sensing technique to measure capacitive sense array 110, where a mutual capacitance is present at the location where each transmit electrode (e.g., row) crosses each receive electrode (e.g., column). The magnitude of change in this mutual capacitance at one or more intersections allows processing device 120 to determine the approximate location of the conductive object.

With mutual capacitance sensing, one set of electrodes (e.g., the rows oriented parallel to the X axis) are designated as transmit (TX) electrodes. The transmit electrodes are driven with an electronic signal 135 provided by processing device 120. In one embodiment, row multiplexer (MUX) 130 may be used to apply the electronic signal 135 to one or more of the transmit electrodes. Another set of electrodes (e.g., the columns oriented parallel to the Y axis) are designated as receive (RX) electrodes. The mutual capacitance between the driven rows and columns may be measured by sampling a signal on each of the receive electrodes. In one embodiment, column multiplexer 140 may be used to couple the signal received on one or more of the receive electrodes and provide the received signal 145 back to processing device 120 for measurement. Row multiplexer 130 and column multiplexer 140, which may be referred to as transmit multiplexer and receive multiplexer respectively, may be used to switch which electrodes are used as transmit electrodes and which are used as receive electrodes during different time slots, as will be described further below.

The designation of rows and columns as transmit and receive electrodes is merely one example, and in other embodiments, the rows and columns may be reversed. In a further embodiment, the allocation of transmit and receive electrodes may be dynamic in nature, such that for one measurement an electrode may be used as a transmit electrode, and in a following measurement occurring at a different time, the same electrode may be used as a receive electrode. For example, in a first time slot, processing device 120 may drive one or more of the rows of capacitive sense array 110 with TX signal 135 and measure the capacitance on the columns to generate RX signal 145. Then, in a subsequent time slot, that occurs at a different time than the first time slot, processing device 120 may drive one or more of the columns of capacitive sense array 110 with a TX signal 145 and measure the capacitance on the rows to generate RX signal 135. Processing device 120 may use RX signal 145 from the first time slot to determine an X axis coordinate of the touch object and use the RX signal 135 from the second time slot to determine a Y axis coordinate of the touch object.

Figure 2:
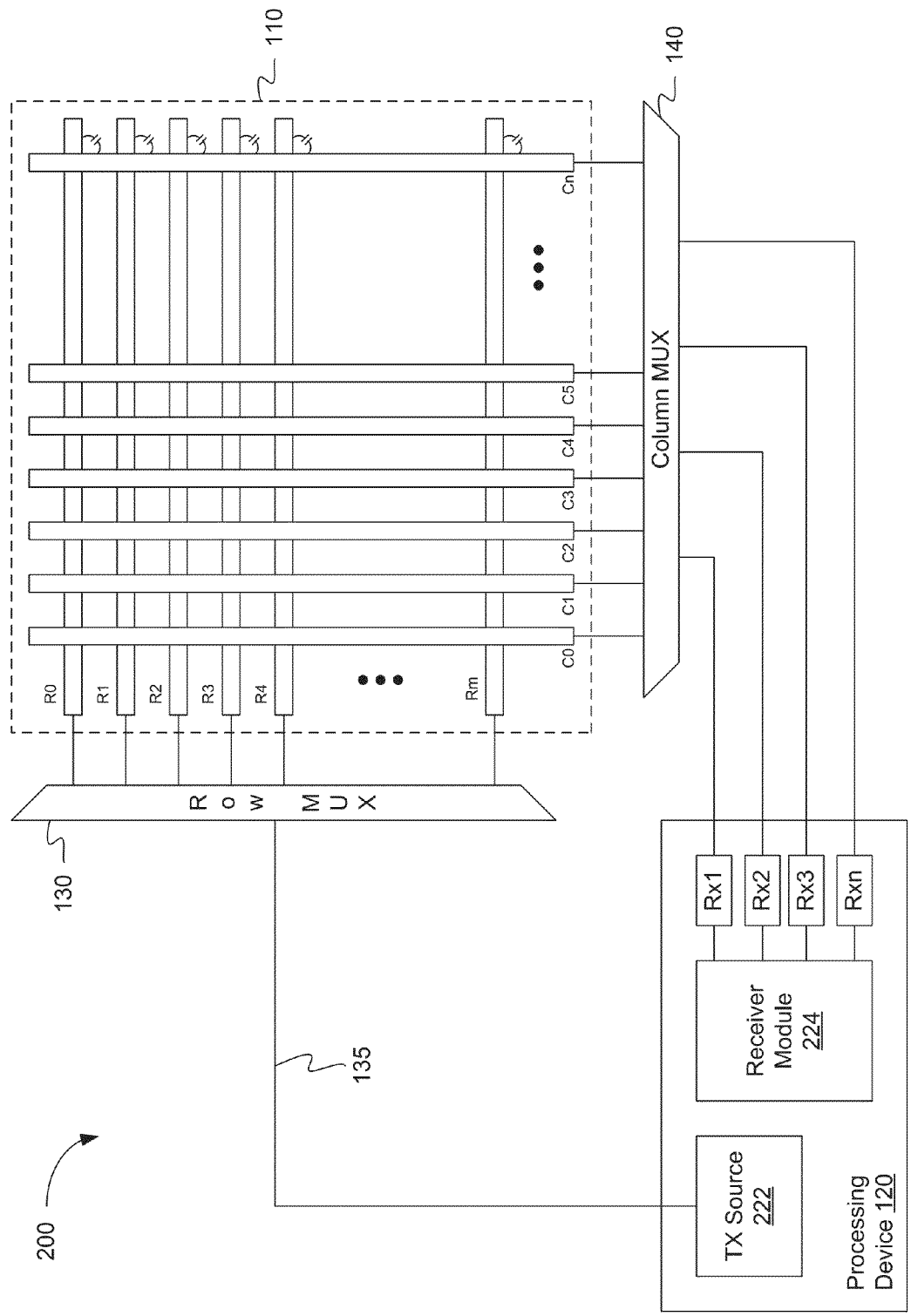
FIG. 2 is a block diagram illustrating a capacitance sensing system, according to an embodiment.

FIG. 2 is a block diagram illustrating a capacitance sensing system 200, according to an embodiment of the present invention. In one embodiment, system 200 includes capacitive sense array 110, processing device 120, and multiplexers 130, 140, as described above with respect to FIG. 1. In capacitive sense array 110, individual row electrodes R0-Rm and column electrodes C0-Cn are shown. In different embodiments, there may be any number of row and column electrodes in capacitive sense array 110.

Each of row electrodes R0-Rm may be connected to row multiplexer 130, which controls application of signal 135. Row multiplexer 130 may selectively apply signal 135 to one or more of row electrodes R0-Rm based on a control signal (not shown). The control signal may be received from processing device 120 or from some other source. Row multiplexer 130 may apply signal 135 to (i.e., drive) a select number of row electrodes at a time (e.g., T0-T3) or may drive all row electrodes at the same time. The row electrodes may be driven sequentially (i.e., one at a time) with the signal 135, or a select number may be driven at the same time. The number of row electrodes driven at one time may also be based on electrical considerations of capacitive sense array 110 and processing device 120, such as the level of charge that column electrodes C0-Cn can handle, or the maximum charge that the signal 135 may provide. In one embodiment, signal 135 is provided by transmit source component 222 of processing device 120. In other embodiments, however, signal 135 may be provided by some other source. In some embodiments, transmit source component 222 may drive multiple row electrodes with a transmit signal 135 having multiple phases, frequencies or amplitudes.

Each of column electrodes C0-Cn may be connected to column multiplexer 140, which controls the application of receive signals to processing device 120 for measurement and processing. In one embodiment, processing device 120 includes receiver module 224. Receiver module 224 may couple to a number of receive channels Rx1, Rx2, Rx3, Rxn, each of which is configurable to measure and process a receive signal from one or more of column electrodes C0-Cn. In other embodiments, there may some other number of receive channels. For example, there may be one receive channel for each column electrode in capacitive sense array 110, thus allowing each column to be measured at the same time. In certain embodiments, however, the number of receive channels may be less than the number of receive electrodes, thus preventing all receive electrodes from being measured at once. Column multiplexer 140 may selectively apply receive signals from a number of column electrodes (e.g., C0-C3) to one receive channel (e.g., Rx1) for measurement based on a control signal (not shown). The control signal may be received from processing device 120 or from some other source.

In one embodiment, the configuration described above may be used in a first time slot in order to determine an X axis coordinate of a touch object proximate to capacitive sense array 110. Since all columns C0-Cn may be sensed at the same time, the noise attributable to either LCD noise or charge noise, on electrode will be consistent. In a subsequent time slot, the configuration may be altered such that TX source component 222 is connected to column multiplexer 140 and receiver module 224 is connected to row multiplexer 130. Processing device 120 may include switching circuitry to enable the configuration change or there may be additional switching circuitry external to processing device (not shown). In the second configuration, the columns C0-Cn may be driven with a transmit signal and all rows R0-Rm may be sensed at the same time in order to determine a Y axis coordinate of the touch object. Although occurring at a different time slot than the determination of the X axis coordinate, the noise will be consistent within the second time slot, allowing for an accurate determination of the touch object position.

Figure 3A:
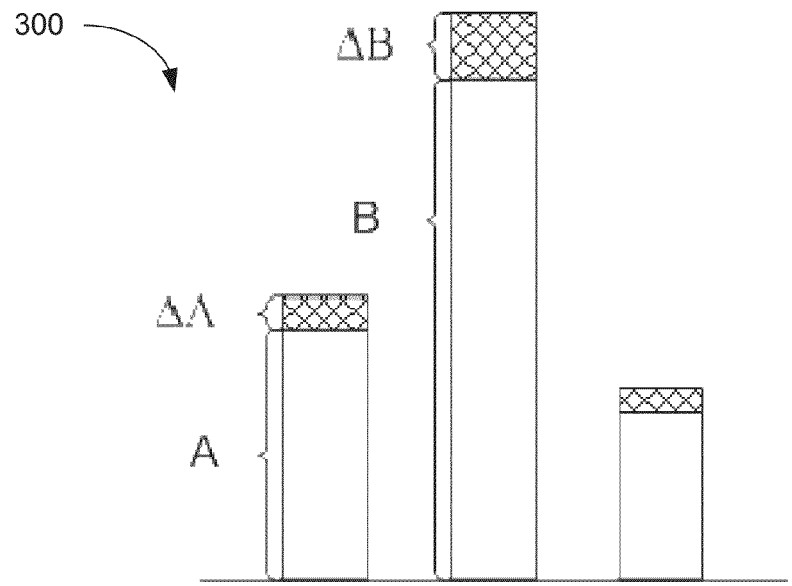
FIG. 3A is a chart illustrating the capacitance values measured on sensor elements of a touch-sensor device and the effect of common-mode charger noise, according to an embodiment.

FIG. 3A is a chart illustrating the capacitance values measured on sensor elements of a touch-sensor device and the effect of common-mode charger noise, according to an embodiment. Charger noise is noise that is physically coupled into the touch-sensor device during the presence of a touch through the battery charger. It can be seen as degraded accuracy or linearity of the touch, false or phantom touches, or even a touchscreen that becomes unresponsive or erratic. Charger noise can typically be attributed to an aftermarket low cost charger.

In the chart 300 of FIG. 3A, the capacitance values A and B may represent the difference between the count value determined by each sensor (e.g., electrode) and a baseline value when no conductive object is present. The horizontal axis of the chart 300 corresponds to the sensor element number (e.g., row electrodes R0-Rm of the capacitive sense array 110). The height of the columns on the vertical axis represents the measured difference counts for each of the electrodes with the presence of a touch object, such as a finger or other capacitive object. The hashed portion of each column labeled ΔA and ΔB represents the portion of the measured capacitance attributable to the charger noise. As illustrated in this embodiment, the charger noise ΔA and ΔB is proportional to the measured capacitance A and B on each electrode. Thus, the charger noise ΔA is less than the charger noise ΔB because the measured capacitance A is less than the measured capacitance B. In this embodiment, the measured capacitance B is a peak value (likely due to the presence of a touch object located adjacent to the corresponding electrode) and thus, the highest amount of charger noise ΔB is also observed on this same electrode.

Figure 3B:
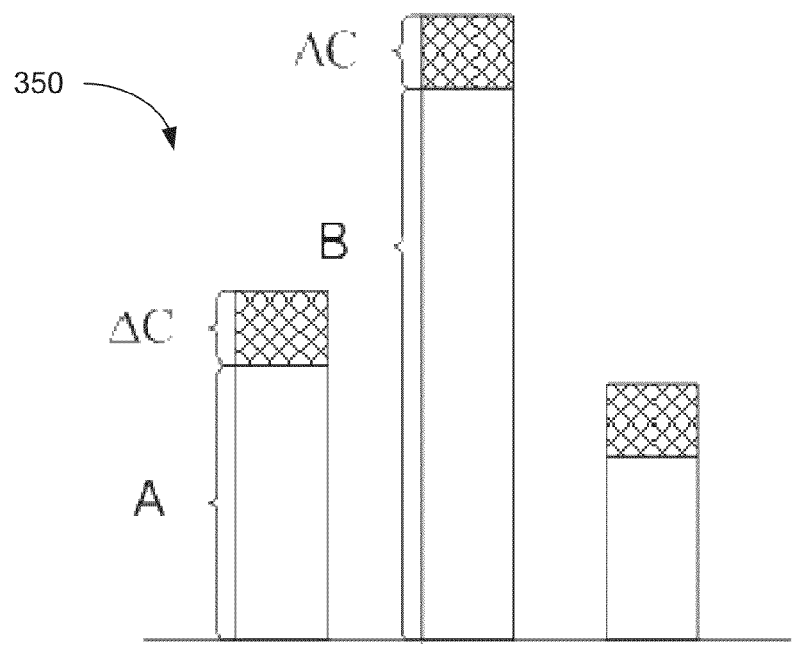
FIG. 3B is a chart illustrating the capacitance values measured on sensor elements of a touch-sensor device and the effect of common-mode display noise, according to an embodiment.

FIG. 3B is a chart illustrating the capacitance values measured on sensor elements of a touch-sensor device and the effect of common-mode display noise, according to an embodiment. The display in an electronic device, such as an LCD used in a touchscreen can generate quite a bit of noise that can be conducted directly into the capacitive touchscreen sensor. The chart 350 of FIG. 3B includes the same capacitance values A and B as well as a display noise portion ΔC. As illustrated in this embodiment, the display noise ΔC is equal across each electrode in the touch-sensor device and is not affected by the amount of measured capacitance A and B on each electrode.

Figure 4:
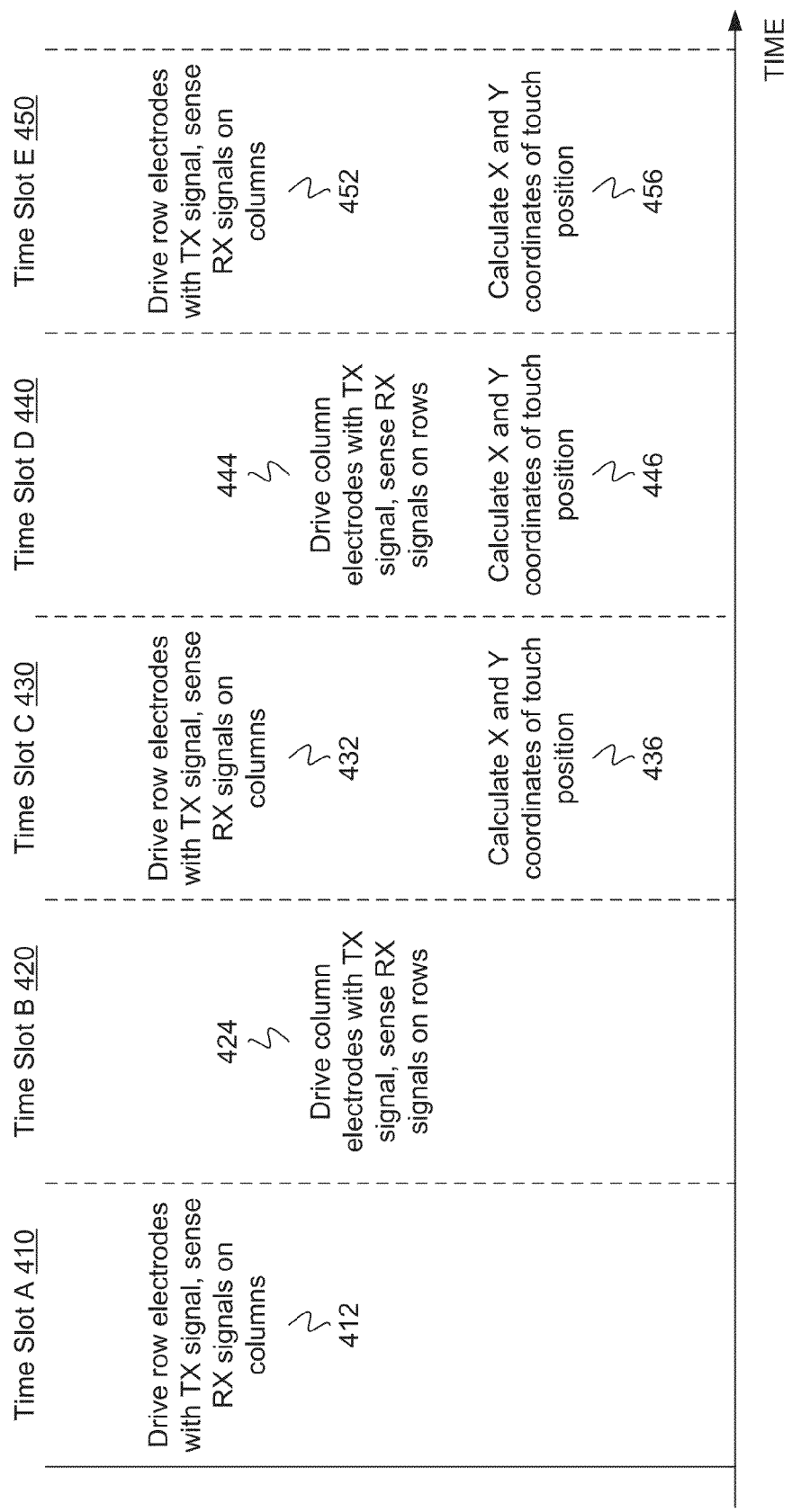
FIG. 4 is a diagram illustrating a two part scanning process for eliminating common mode noise in touch applications, according to an embodiment.

FIG. 4 is a diagram illustrating a two part scanning process for eliminating common mode noise in touch applications, according to an embodiment. In one embodiment, the scanning process may be performed by processing logic that comprises hardware (e.g., circuitry, dedicated logic, programmable logic, microcode), software (e.g., instructions run on a processing device to perform hardware simulation), or a combination thereof. The processing logic is scan one side of a touch-sensor device during a first time slot and the orthogonal side of the touch-sensor device during a second time slot in order to determine the location of a touch-object. In one embodiment, processing device 120, as shown in FIGS. 1 and 2 may perform the operations described herein.

In one embodiment, at 412, processing device 120 scans, during a first operations or time slot A 410, a plurality of electrodes C0-Cn along a first axis of capacitive sense array 110 to generate a plurality of signals corresponding to the mutual capacitance at electrode intersections of capacitive sense array 110. Column multiplexer 140 may provide the measured signals to corresponding receive channels Rx1-Rxn of processing device 120. In one embodiment, transmit source 222 drives one or more electrodes R0-Rm along a second axis of capacitive sense array 110 with a TX signal 135. TX signal 135 excites the electrodes to generate the mutual capacitance at each electrode intersection.

In one embodiment, at 424, processing device 120 scans, during a second operations or time slot B 420, a second plurality of electrodes R0-Rn along the second axis of capacitive sense array 110 to generate a plurality of signals corresponding to the mutual capacitance at electrode intersections of capacitive sense array 110. Row multiplexer 130 may provide the measured signals to corresponding receive channels Rx1-Rxn of processing device 120. In one embodiment, transmit source 222 drives one or more electrodes C0-Cn along the first axis of capacitive sense array 110 with a TX signal. In one embodiment, there are at least as many receive channels in processing device 120 as there are either column or row electrodes in capacitive sense array 110. In one embodiment, the second time slot B 420 includes a different period of time that the first time slot A 410 and occurs subsequent to the first time slot A 410 without overlapping. In other embodiments, the order of scanning the rows and columns of capacitive sense array 110 may be reversed. Thus, in one embodiment, processing device 120 may scan the row electrodes in time slot A 410 and scan the column electrodes in time slot B 420.

In one embodiment, at 436, processing device 120 determines a first coordinate of a conductive object proximate to the capacitive sense array 110 based on the signals measured in time slot A 410. Processing device 120 may also determine a second coordinate of the conductive object based on the signals measured in time slot B 420. In one embodiment, processing device 120 may determine these coordinates during a third operation or time slot C 430. In other embodiments, processing device 120 may determine each coordinate at a separate time, such as for example after completing the scanning during a certain time slot but before beginning scanning in the next time slot. The determined coordinates may indicate the position of the touch object on the capacitive sense array 110.

In one embodiment, while calculating the coordinates of the touch position 436 during time slot C 430, at 432, processing device 120 rescans, the first plurality of electrodes C0-Cn along a first axis of capacitive sense array 110 to generate a plurality of signals corresponding to the mutual capacitance at electrode intersections of capacitive sense array 110. In a fourth operations or time slot D 440, at 444, processing device 120 rescans, the second plurality of electrodes R0-Rn along the second axis of capacitive sense array 110 to generate a plurality of signals corresponding to the mutual capacitance at electrode intersections of capacitive sense array 110. Also during time slot D 440, at 446, processing device 120 calculates X and Y coordinates of a conductive object proximate to the capacitive sense array 110 based on the signals measured at 424 and 432. In a fifth operation or time slot E 450, at 452 processing device 120 again rescans, the first plurality of electrodes C0-Cn along a first axis of capacitive sense array 110 to generate a plurality of signals corresponding to the mutual capacitance at electrode intersections of capacitive sense array 110 and at 456 processing device 120 calculates X and Y coordinates of a conductive object proximate to the capacitive sense array 110 based on the signals measured at 432 and 444. In alternating time slots going forward, processing device 120 may alternately scan the rows and columns of capacitive sense array 110 and in each time slot calculate the coordinates based on the capacitance signals measured during the previous two time slots.

To calculate the coordinates for the position of the touch object, the processing device 120 may select a touch position equation, from a plurality of touch position equations. The equations may include, for example, a centroid equation which is not sensitive to multiplicative charger noise, a linear interpolation equation which is not sensitive to multiplicative charger noise or additive display noise, or other equations. Since the common-mode noise is consistent for the measurement signals on each electrode along a single axis of the touch-sensor device, these equations can effectively remove any measurement error attributable to the noise and output an accurate positional coordinate. Many displays currently used in electronic device have relatively low noise (e.g. AMOLED displays). In these cases, the processing device 120 can use an algorithm, such as the centroid equation, that suppress only charger noise and gives good performance (e.g. accuracy, linearity) for a specific display in a low noise environment. For other displays with higher noise, the processing device 120 can use the linear interpolation equation (even though charger noise may not be a concern. If the display noise is low in a certain device, the processing device perform scanning without Tx-Rx swapping and use a best fit math solution to determine which equation with provide the best performance without noise. If charger noise appears, processing device 120 can switch and apply the centroid equation (if it gives better performance or better satisfy customer requirements) or the linear interpolation equation. This definition could be done during design tuning (i.e., before production).

In one embodiment, the centroid equation is as follows:

$$X = \text{Pitch} \cdot \left[ i + \frac{1}{2} + \frac{S_{i+1} - S_{i-1}}{S_{i-1} + S_i + S_{i+1}} \right]$$

In the centroid equation, S may represent the signal response (or the measured capacitance) on a particular electrode. i may represent the electrode where the conductive object, such as a finger, is located, with i+1 representing the electrode to the right of i and i−1 representing the electrode to the left. Pitch is a value based on the size of the capacitive sense array and the output value X represents the X axis coordinate of the location of the finger touch. In one embodiment, the output value X is not effected by multiplicative error, such as common-mode noise from a charger. The centroid equation, however, may be susceptible to additive error, such as common-mode display noise. The same equation may be used for the results of the scanning during the second time slot to determine the Y axis coordinate of the location of the finger touch.

In one embodiment, the linear interpolation equation is as follows:

$$X = \text{Pitch} \cdot \left[ i + \frac{1}{2} + \frac{S_{i+1} - S_{i-1}}{2 \cdot (S_i - \min(S_{i+1}, S_{i-1}))} \right]$$

In the linear interpolation equation, the output value X is not effected by either multiplicative error, such as common-mode charger noise or additive error, such as common-mode display noise. The same equation may be used for the results of the scanning during the second time slot to determine the Y axis coordinate of the location of the finger touch.

Figure 5:
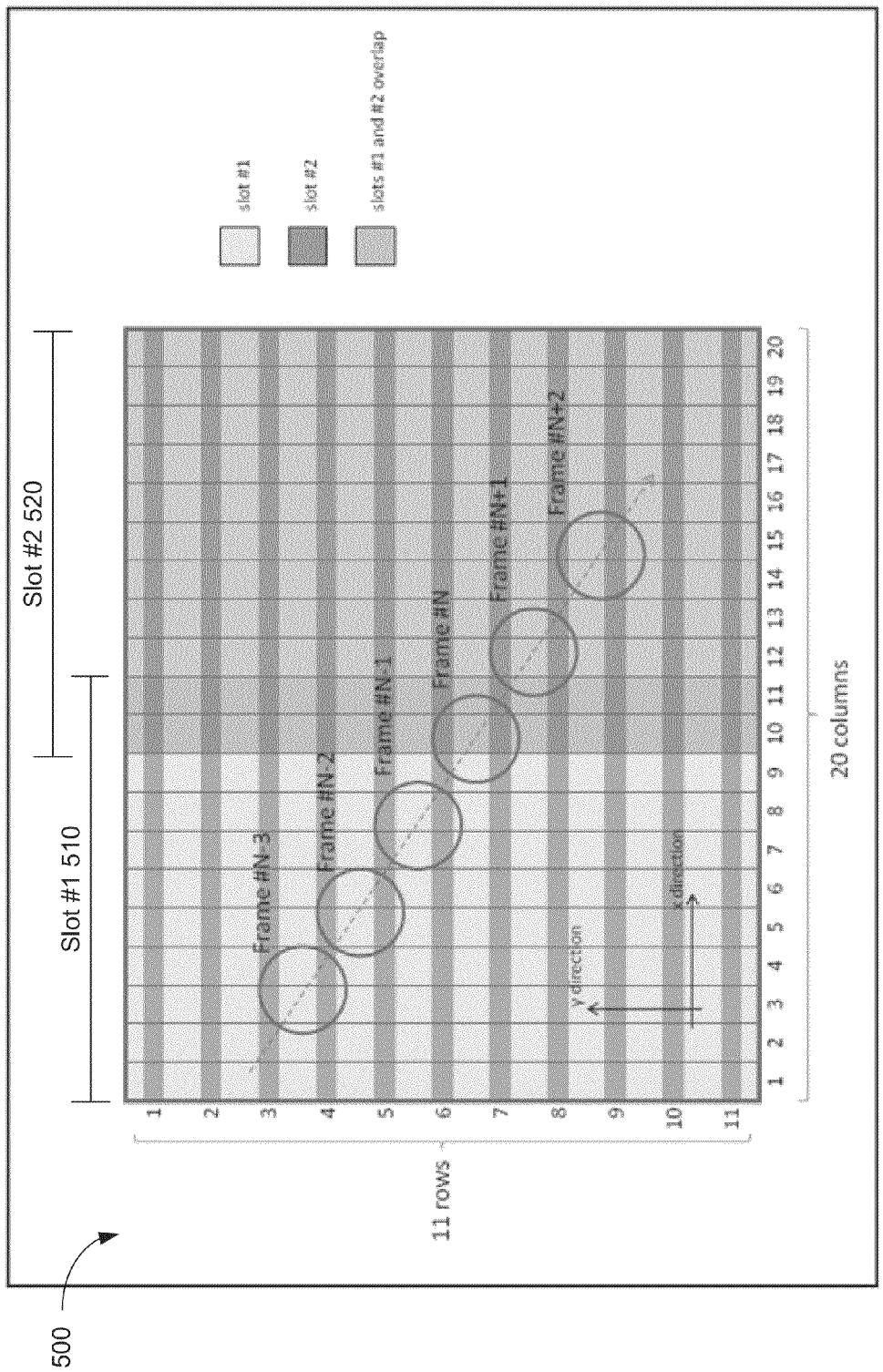
FIG. 5 is a chart illustrating overlapping time slots for scanning a capacitive sense array, according to an embodiment.

FIG. 5 is a chart 500 illustrating overlapping time slots for scanning a capacitive sense array, according to an embodiment. In some cases, the number of rows R0-Rm or columns C0-Cn in a capacitive sense array 110 may outnumber the number of receive channels Rx0-RxN in a processing device 120. In such a situation, the processing device 120 may not be able to scan all of the rows or all of the columns in a single time slot. Accordingly, in one embodiment, processing device 120 may use scan the electrodes along one or both axes of capacitive sense array 110 over multiple time slots.

Chart 500 illustrates a capacitive sense array having 11 rows and 20 columns. In this embodiment, the processing device 120 includes 11 receive channels, which is enough to scan the 11 rows in a single time slot, but not the 20 columns. In one embodiment during a first time slot 510, columns 1-11 are scanned and during a second time slot 520, columns 10-20 are scanned. Thus, there is an overlap of at least two electrodes (e.g., columns 10 and 11) between the two time slots 510 and 520.

Figure 6:
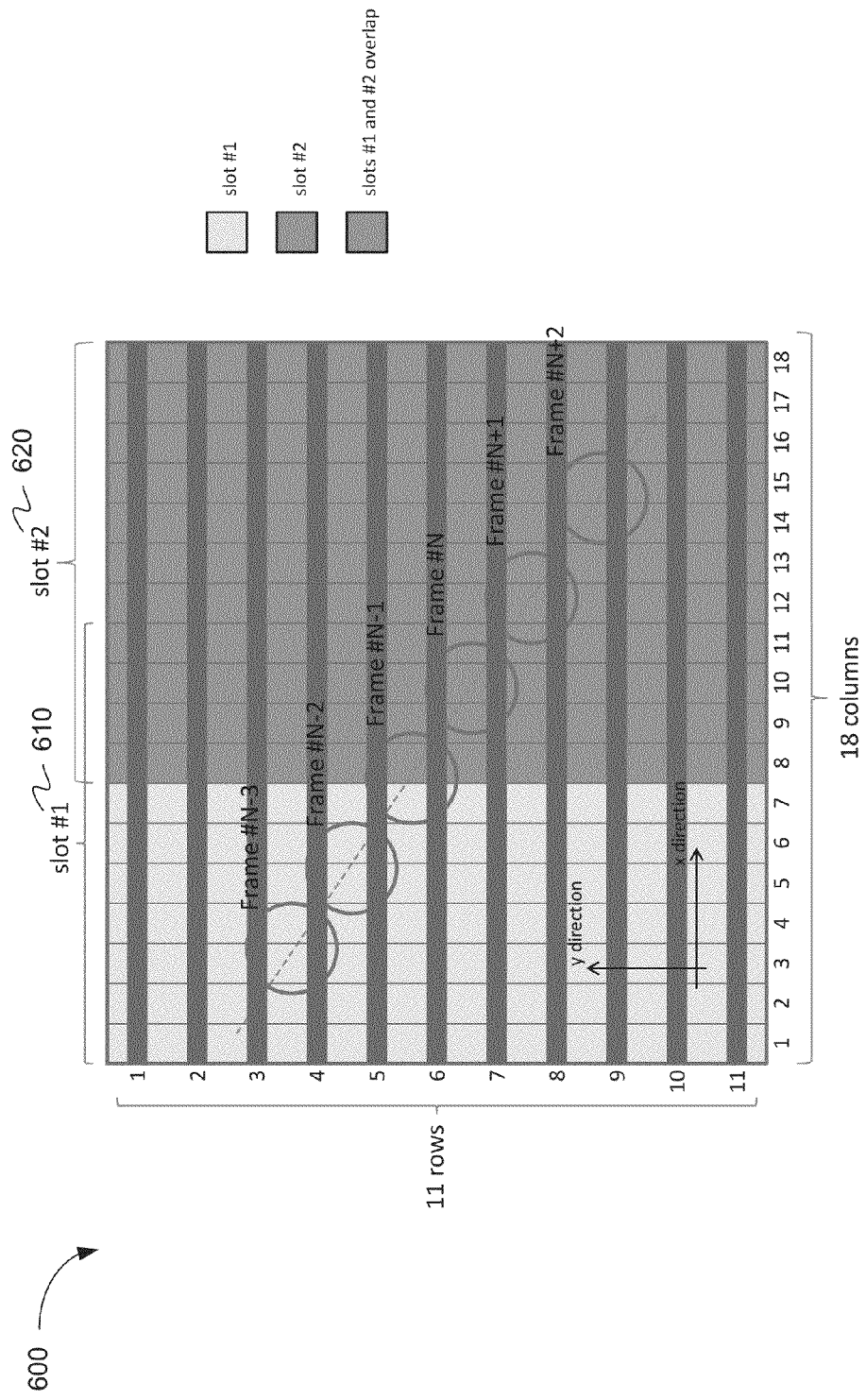
FIG. 6 is a chart illustrating overlapping time slots for scanning a capacitive sense array, according to an embodiment.

FIG. 6 is a chart 600 illustrating overlapping time slots for scanning a capacitive sense array, according to an embodiment. Chart 600 illustrates a capacitive sense array having 11 rows and 18 columns. In this embodiment, the processing device 120 includes 11 receive channels, which is enough to scan the 11 rows in a single time slot, but not the 18 columns. In one embodiment during a first time slot 610, columns 1-11 are scanned and during a second time slot 620, columns 8-18 are scanned. Thus, there is an overlap of at four electrodes (e.g., columns 8-11) between the two time slots 610 and 620.

This overlap of at least four electrodes may be useful when the touch-object (e.g., a finger) is slightly larger, such as approximately 9-14 millimeters.

By introducing this overlap of electrodes between the two time slots 510 and 520, the correlated nature of the noise can be preserved as a touch object moves across the screen. FIGS. 5 and 6 show that for a touch moving across the surface of a capacitive sense array, at each location it is possible to find at least three (or five) sensors from during one scanning operation (e.g., time slot) and apply the common mode noise suppression features, as described above. Using signals from different time slots for position calculation when noise is present in the system may be equal to normal scanning without any Tx-Rx swapping.

Figure 7:
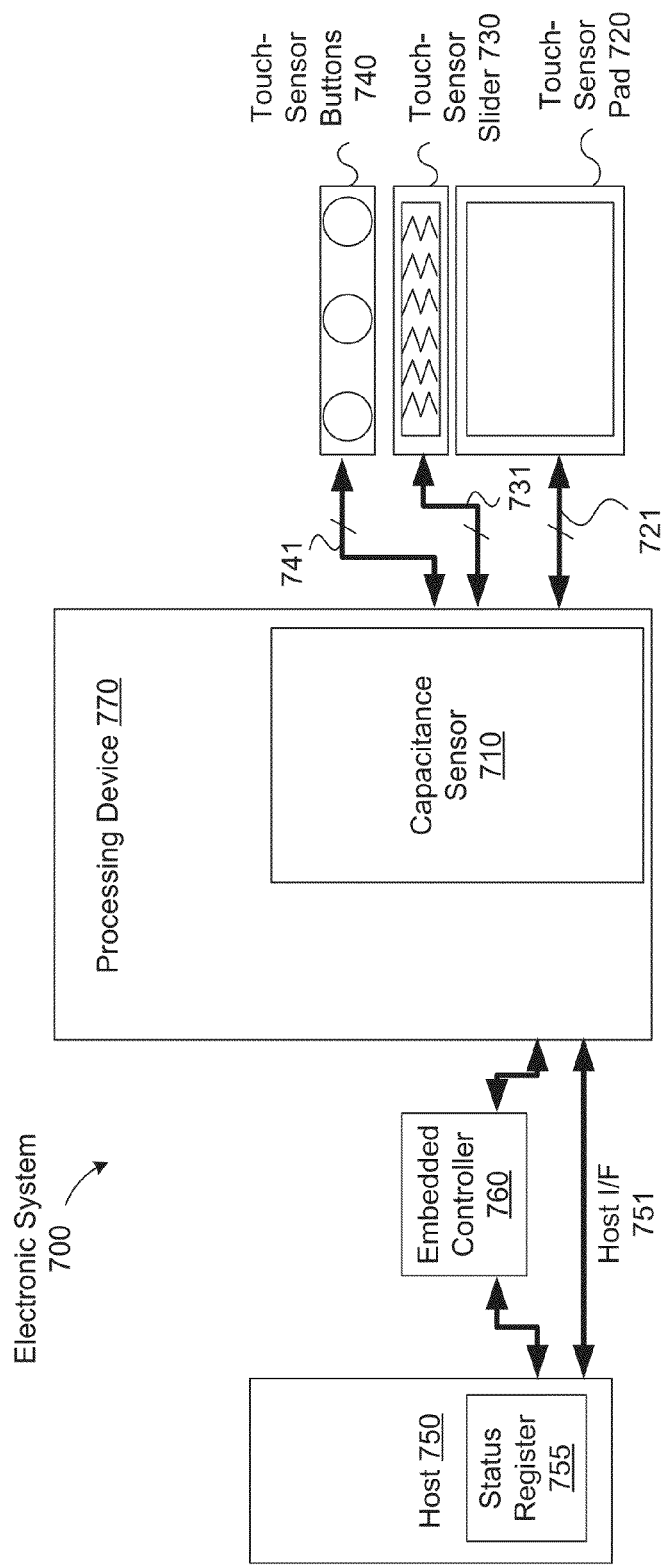
FIG. 7 is a block diagram illustrating an electronic system having a processing device for detecting a presence of a conductive object, according to an embodiment.

FIG. 7 illustrates a block diagram of one embodiment of an electronic system having a processing device for detecting a presence and determining a location of a conductive object. Electronic system 700 includes processing device 770, touch-sensor pad 720, touch-sensor slider 730, touch-sensor buttons 740, host processor 750, and embedded controller 760. As illustrated, capacitance sensor 710 may be integrated into processing device 770. Capacitance sensor 710 may include analog I/O for coupling to an external component, such as touch-sensor pad 720, touch-sensor slider 730, touch-sensor buttons 740, and/or other devices. In one embodiment, processing device 770 may be representative of processing device 120 discussed above and may also include multiplexers 130, 140.

In one embodiment, the electronic system 700 includes touch-sensor pad 720 coupled to the processing device 770 via bus 721. Touch-sensor pad 720 may include one or more electrodes arranged to form a capacitive sense array such as array 110. For the touch-sensor pad 720, the one or more electrodes may be coupled together to detect a presence of a conductive object on or near the surface of the sensing device. In one embodiment, processing device 770 couples signals into and accepts signals from touch-sensor pad 720 representing capacitance sensed by the capacitive sense array via bus 721. In an alternative embodiment, the electronic system 700 includes a touch-sensor slider 730 coupled to the processing device 770 via bus 731. In another embodiment, the electronic system 700 includes a touch-sensor buttons 740 coupled to the processing device 770 via bus 741.

The electronic system 700 may include any combination of one or more of the touch-sensor pad, a touch-sensor screen, a touch-sensor slider, and touch-sensor buttons. In one embodiment, buses 721, 731 and 741 may be a single bus. Alternatively, the bus may be configured into any combination of one or more separate signals or buses.

In one exemplary embodiment, processing device 770 may be a Programmable System on a Chip (PSoC+200) processing device, developed by Cypress Semiconductor Corporation, San Jose, Calif. Alternatively, processing device 770 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 770 may communicate with an external component, such as a host processor 750, via host interface (I/F) line 751. In one embodiment, host processor 750 includes status register 755.

In one example, if processing device 770 determines that a conductive object is present on touch-sensor pad 720, processing device 770 sends instructions to update status register 755 to indicate the presence and location of the conductive object. In an alternative embodiment, processing device 770 sends an interrupt request to host processor 750 via interface line 751.

It should also be noted that the embodiments described herein are not limited to having a configuration of a processing device coupled to a host, but may include a system that measures the equivalent capacitance on the sensing device and sends the raw data to a host computer where it is analyzed by an application. In effect the processing that is done by processing device 770 may also be done in the host. In another embodiment, the processing device 770 is the host.

It should be noted that the components of electronic system 700 may include all the components described above. Alternatively, electronic system 700 may include only some of the components described above, or include additional components not listed herein. It should also be noted that any one of various known methods for measuring capacitance may be used, for example relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. The terms "first," "second," "third," "fourth," etc. as used herein are meant as labels to distinguish among different elements and may not necessarily have an ordinal meaning according to their numerical designation.

What is claimed:

1. A method comprising:
    scanning, during a first operation, a first plurality of electrodes along a first axis in a capacitive sense array to generate a first plurality of signals corresponding to a mutual capacitance at electrode intersections of the capacitive sense array, the first plurality of signals to identify a first coordinate of a conductive object proximate to the capacitive sense array;
    scanning, during a second operation, a second plurality of electrodes along a second axis in the capacitive sense array to generate a second plurality of signals corresponding to the mutual capacitance at the electrode intersections of the capacitive sense array, the second plurality of signals to identify a second coordinate of the conductive object, wherein the second operation occurs during a different period of time than the first operation;
    determining, by a processing device during a third operation, the first coordinate of the conductive object proximate to the capacitive sense array based on the first plurality of signals and the second coordinate of the conductive object based on the second plurality of signals, the first coordinate and the second coordinate comprising a first location of the conductive object on the capacitive sense array;
    scanning, during the third operation, the first plurality of electrodes to generate a third plurality of signals, the third plurality of signals to identify a third coordinate of the conductive object, wherein each of the first plurality of electrodes are scanned during the third operation regardless of a result of the first and second; and
    determining, during a fourth operation, a third coordinate of the conductive object based on the third plurality of signals, the second coordinate and the third coordinate comprising a second location of the conductive object on the capacitive sense array.

2. The method of claim 1, wherein scanning the first plurality of electrodes comprises:
    driving one or more of the second plurality of electrodes along the second axis with a transmit signal; and
    measuring a receive signal from the first plurality of electrodes along the first axis.

3. The method of claim 1, wherein scanning the second plurality of electrodes comprises:
    driving one or more of the first plurality of electrodes along the first axis with a transmit signal; and
    measuring a receive signal from the second plurality of electrodes along the second axis.

4. The method of claim 1, wherein the second operation occurs subsequent to the first operation and does not overlap in time with the first operation.

5. The method of claim 1, further comprising:
    identifying a touch position equation, from a plurality of touch position equations, for use in determining the first coordinate and the second coordinate of the conductive object.

6. The method of claim 1, wherein the third coordinate corresponds to the first coordinate at a subsequent time.

7. The method of claim 1, wherein the third plurality of electrodes overlaps the second plurality of electrodes by at least two electrodes.

8. An apparatus comprising:
    a capacitive sense array; and
    a processing device coupled to the capacitive sense array, the processing device configured to:
        generate, during a first operation, a first plurality of signals from a first plurality of electrodes along a first axis in the capacitive sense array, the first plurality of signals corresponding to a mutual capacitance at electrode intersections of the capacitive sense array, the first plurality of signals to identify a first coordinate of a conductive object proximate to the capacitive sense array;
        generate, during a second operation, a second plurality of signals from a second plurality of electrodes along a second axis in the capacitive sense array, the second plurality of signals corresponding to the mutual capacitance at the electrode intersections of the capacitive sense array, the second plurality of signals to identify a second coordinate of the conductive object, wherein the second operation occurs during a different period of time than the first operation;
        determine, during a third operation, the first coordinate of the conductive object proximate to the capacitive sense array based on the first plurality of signals and the second coordinate of the conductive object based on the second plurality of signals, the first coordinate and the second coordinate comprising a first location of the conductive object on the capacitive sense array;
        generate, during the third operation, a third plurality of signals from the first plurality of electrodes, the third plurality of signals to identify a third coordinate of the conductive object, wherein each of the first plurality of electrodes are scanned during the third operation regardless of a result of the first and second operations; and
        determine, during a fourth operation, a third coordinate of the conductive object based on the third plurality of signals, the second coordinate and the third coordinate comprising a second location of the conductive object on the capacitive sense array.

9. The apparatus of claim 8, wherein to generate the first plurality of signals, the processing device is configured to:
    drive one or more of the second plurality of electrodes along the second axis with a transmit signal; and
    measure a receive signal from the first plurality of electrodes along the first axis.

10. The apparatus of claim 8, wherein to generate the second plurality of signals, the processing device is configured to:
    drive one or more of the first plurality of electrodes along the first axis with a transmit signal; and
    measure a receive signal from the second plurality of electrodes along the second axis.

11. The apparatus of claim 8, wherein the second operation occurs subsequent to the first operation and does not overlap in time with the first operation.

12. The apparatus of claim 8, wherein the processing device is further configured to:
  identify a touch position equation, from a plurality of touch position equations, for use in determining the first coordinate and the second coordinate of the conductive object.

13. The apparatus of claim 8, wherein the third coordinate corresponds to the first coordinate at a subsequent time.

14. The apparatus of claim 8,
  wherein the third plurality of electrodes overlaps the second plurality of electrodes by at least two electrodes.

15. An apparatus comprising:
  a touch-sensor device, the touch-sensor device comprising an array of capacitive sense elements, the array comprising a plurality of transmit electrodes and a plurality of receive electrodes;
  a transmit selection circuit coupled to the touch-sensor device, the transmit selection circuit to selectively apply a transmit signal to one or more of the transmit electrodes;
  a receive selection circuit coupled to the touch-sensor device, the receive selection circuit to selectively measure a signal from one or more of the receive electrodes, wherein the measured signal corresponds to a mutual capacitance value between a transmit electrode and a receive electrode; and
  a processing device coupled to the touch-sensor device, the processing device configured to:
    measure, during a first operation, a capacitance value from the receive electrodes along a first axis in the capacitive sense array to determine a first coordinate of a conductive object proximate to the touch-sensor device;
    switch an orientation of the transmit and receive electrodes;
    measure, during a second operation, a capacitance value from the receive electrodes along a second axis in the capacitive sense array to determine a second coordinate of the conductive object, the first coordinate and the second coordinate comprising a first location of the conductive object on the touch-sensor device, wherein the second operation occurs during a different period of time than the first operation;
    switch the orientation of the transmit and receive electrodes; and
    measure, during a third operation, a capacitance value from the receive electrodes along the first axis to determine a third coordinate of the conductive object, wherein each of the receive electrodes are measured during the third operation regardless of a result of the first and second operations, the second coordinate and the third coordinate comprising a second location of the conductive object on the capacitive sense array.

16. The apparatus of claim 15, wherein to measure a capacitance value from the receive electrodes along the first axis, the processing device is configured to:
  drive one or more of the transmit electrodes along the second axis with a transmit signal; and
  measure a receive signal from the receive electrodes along the first axis.

17. The apparatus of claim 15, wherein to measure a capacitance value from the receive electrodes along the second axis, the processing device is configured to:
  drive one or more of the transmit electrodes along the first axis with a transmit signal; and
  measure a receive signal from the receive electrodes along the second axis.

18. The apparatus of claim 15, wherein the second operation occurs subsequent to the first operation and does not overlap in time with the first operation.

19. The apparatus of claim 15, wherein the processing device is further configured to:
  identify a touch position equation, from a plurality of touch position equations, for use in determining the first coordinate and the second coordinate of the conductive object.

20. The apparatus of claim 15, wherein the processing device determines the first coordinate and the second coordinate during the third operation, and wherein the third coordinate corresponds to the first coordinate at a subsequent time.

* * * * *